(12) United States Patent
Martineau

(10) Patent No.: US 8,998,652 B2
(45) Date of Patent: Apr. 7, 2015

(54) INTERACTIVE PIN ARRAY DEVICE

(71) Applicant: Pascal Martineau, Mirabel (CA)

(72) Inventor: Pascal Martineau, Mirabel (CA)

( * ) Notice: Subject to any disclaimer, the term of this patent is extended or adjusted under 35 U.S.C. 154(b) by 267 days.

(21) Appl. No.: 13/719,168

(22) Filed: Dec. 18, 2012

(65) Prior Publication Data

US 2014/0170870 A1 Jun. 19, 2014

(51) Int. Cl.
*H01R 13/24* (2006.01)
*G06F 3/01* (2006.01)
*A63F 13/98* (2014.01)
*G09B 21/00* (2006.01)

(52) U.S. Cl.
CPC ............... *G06F 3/01* (2013.01); *G09B 21/003* (2013.01); *A63F 13/02* (2013.01); *A63F 2300/301* (2013.01); *A63F 2300/308* (2013.01); *G09B 21/004* (2013.01)

(58) Field of Classification Search
None
See application file for complete search history.

(56) References Cited

U.S. PATENT DOCUMENTS

| | | |
|---|---|---|
| 3,594,787 A | 7/1971 | Ickes |
| 3,987,438 A | 10/1976 | Lindenmueller et al. |
| 4,191,945 A | 3/1980 | Hannen et al. |
| 4,543,732 A | 10/1985 | Maples |
| 4,931,726 A * | 6/1990 | Kasukabe et al. ....... 324/755.05 |
| 5,717,423 A | 2/1998 | Parker |
| 5,793,918 A | 8/1998 | Hogan |
| 5,796,620 A | 8/1998 | Laskowski et al. |
| 5,942,970 A | 8/1999 | Norman |
| 6,109,922 A | 8/2000 | Litschel et al. |
| 6,137,478 A * | 10/2000 | Coons ........................... 345/168 |
| 6,189,246 B1 | 2/2001 | Gorthala |
| 6,503,089 B2 * | 1/2003 | Saijo et al. ....................... 439/70 |
| 6,625,088 B1 * | 9/2003 | Mah et al. ......................... 368/76 |
| 6,700,553 B2 * | 3/2004 | Becker et al. .................... 345/31 |
| 6,743,043 B2 * | 6/2004 | Yamada ......................... 439/482 |
| 6,902,410 B2 * | 6/2005 | Watanabe ........................ 439/66 |
| 7,009,595 B2 * | 3/2006 | Roberts et al. ................ 345/156 |
| 7,245,292 B1 * | 7/2007 | Custy ............................. 345/173 |
| 8,203,529 B2 * | 6/2012 | Rogowitz et al. ............. 345/156 |

(Continued)

FOREIGN PATENT DOCUMENTS

| | | |
|---|---|---|
| GB | 2371914 | 7/2002 |
| JP | 8005357 | 1/1996 |
| WO | WO2009051723 | 4/2009 |
| WO | WO2011034434 | 3/2011 |

OTHER PUBLICATIONS

Visnjic, Filip,. inFORM-Dynamic Shape Display from Tangible Media Group. Published Nov. 13, 2013. Retrieved from internet,URL: http://www.creativeapplications.net/openframeworks/inform-dynamic-shape-display-from-tangible-media-group/.*

(Continued)

*Primary Examiner* — Michael Zarroli

(57) ABSTRACT

An interactive pin array device comprising a plurality of elongated pins held in a frame and forming a set. The frame is adapted to hold the plurality of pins in a parallel position to one another in a series of columns and rows, such that the distal ends of the plurality of pins together form a flat virtual plane. Each pin of the plurality of pins includes an elongated housing member defining a linear axis therethrough, and a pin member adapted to slide linearly in either direction along the axis. Each of the housing member includes an upper electromagnet, and a lower electromagnet separated from the upper electromagnet.

12 Claims, 5 Drawing Sheets

(56) References Cited

U.S. PATENT DOCUMENTS

| | | | |
|---|---|---|---|
| 8,506,307 B2* | 8/2013 | Henry et al. | 439/66 |
| 8,535,101 B2* | 9/2013 | Suzuki et al. | 439/626 |
| 8,573,979 B2* | 11/2013 | Skinner | 434/114 |
| 8,725,292 B2* | 5/2014 | Perlin et al. | 700/245 |
| 2011/0008974 A1* | 1/2011 | Salomie | 439/55 |

OTHER PUBLICATIONS

Orf, Darren,. How It Works: MIT's inFORM Dynamic Shape Display, published Dec. 2, 2013. Retrieved from internet,URL: http://www.popularmechanics.com/technology/engineering/gonzo/how-mits-inform-dynamic-display-works-16222829?click=main_sr.*

* cited by examiner

INTERACTIVE PIN ARRAY DEVICE

This application claims priority based on request GB1121933.4 filed on Dec. 20, 2011

FIELD OF THE INVENTION

The present invention relates generally to interactive devices but more particularly to an interactive pin array device.

BACKGROUND OF THE INVENTION

Prior art consists of a boxed surface made of a crowded array of pins that are free to slide in and out independently in a screen to create a three dimensional relief. [P]atterns can be created by first creating a computer image which then actuates pins on a pin array so that they move into the desired configuration. Inversely, manually pushing pins on a pin array can send a signal to a computer so that a virtual image is generated. There are many uses for pin arrays both in the artistic and technical fields.

SUMMARY OF THE INVENTION

In view of the foregoing disadvantages inherent in the known devices now present in the prior art, the present invention, which will be described subsequently in greater detail, is to provide objects and advantages which are:

To provide for an economical, compact and simple to use a pin array device that can send its signal over the Internet.

In order to do so, the invention is an interactive pin array device comprising a plurality of elongated pins held in a frame and forming a set. The frame is adapted to hold the plurality of pins in a parallel position to one another in a series of columns and rows, such that the distal ends of the plurality of pins together form a flat virtual plane.

Each pin of the plurality of pins includes an elongated housing member defining a linear axis therethrough, and a pin member adapted to slide linearly in either direction along the axis. Each of the housing member includes an upper electromagnet, and a lower electromagnet separated from the upper electromagnet.

Each of the electromagnet is adapted to move its respective pin member linearly in either direction. Each of the pin member includes at least one linear potentiometer, a, magnet and an electronic transmitter attached to an opposite end to the distal end, such that when each of the pin members are moved linearly each respective linear potentiometer sends a signal to its respective transmitter which in turn sends an electronic signal describing its movement within its respective housing member. a plurality of electronic wires respectively connected to each transmitter, such that electronic signals can be relayed to and from each respective pin; an analog-digital converter connected to the plurality of electronic wires and adapted to convert the analog electronic signals relayed by the transmitters into digital format to be transmitted, processed, stored, and then converted back into analog form for return transmittal to the set of pins.

A microprocessor device connected to the converter and adapted to retrieve the electronic signals from the converter, store them, and re-transmit them back to the converter when desired, such that a user can displace the pin members from the virtual plane in any pattern, have electronic signals sent, processed, stored, and returned to the same set of pins, or another separate set of pins, at a later time to thereby displace the pins to the same positions as the original pattern chosen by the user.

The interactive pin array device has each of the housing member of each pin comprise an upper frame upper electromagnet, upper spring, lower electromagnet, lower spring and shield along the entire upper frame wall to separate magnetic field between each interactive pin.

The lower frame consists of the outer fixed part of the potentiometer and electronic transmission from electronic transmitter to both electromagnets.

The pin consists of a magnet, a mobile portion of the potentiometer, electronic transmitter that picks up all the wire and sends position signal and feeds the power to both electromagnets via the lower housing.

The electronic signal is formed as a Pulse Width Modulation signal, and the displacement of each of the pin members is proportional to the strength of the Pulse Width Modulation signal received by the electromagnets.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

DETAILED DESCRIPTION OF THE PREFERRED EMBODIMENT

Figure 1A:
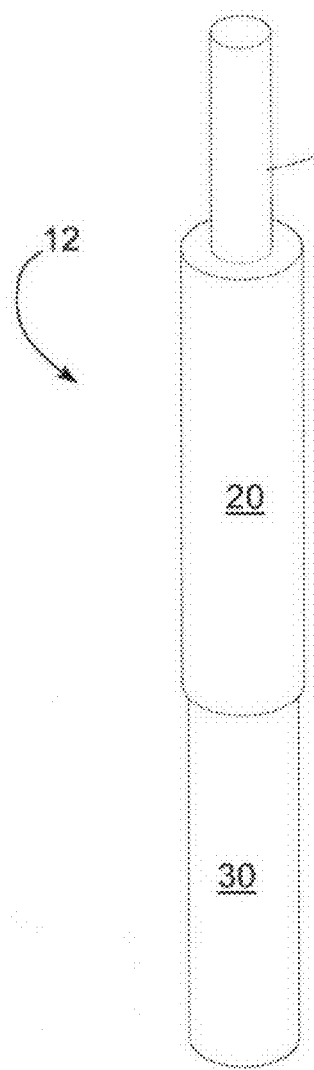
FIGS. 1*a-b* Isometric view and isometric cutaway views of an electromechanical pin.
Figure 1B:
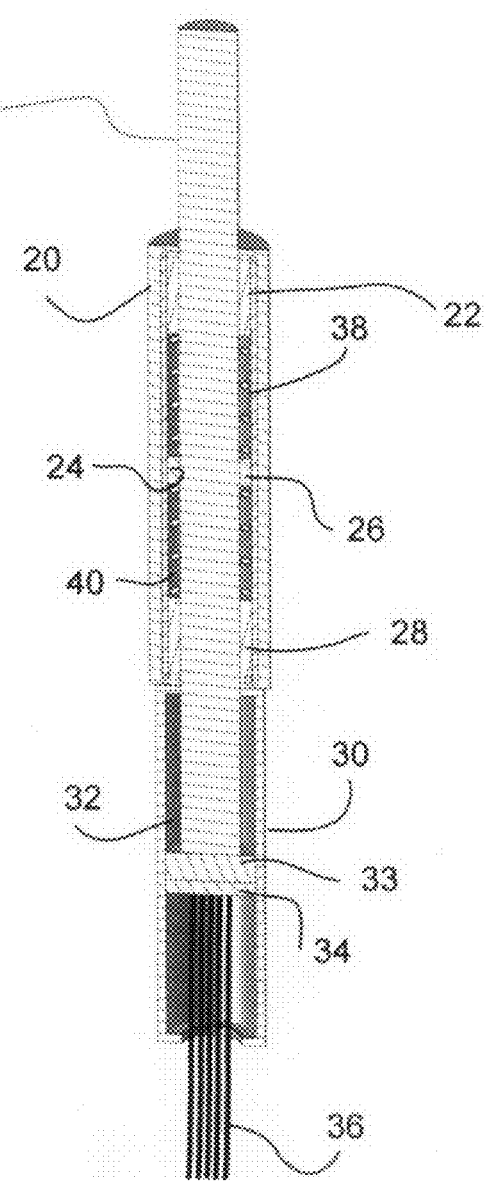
Figure 2:
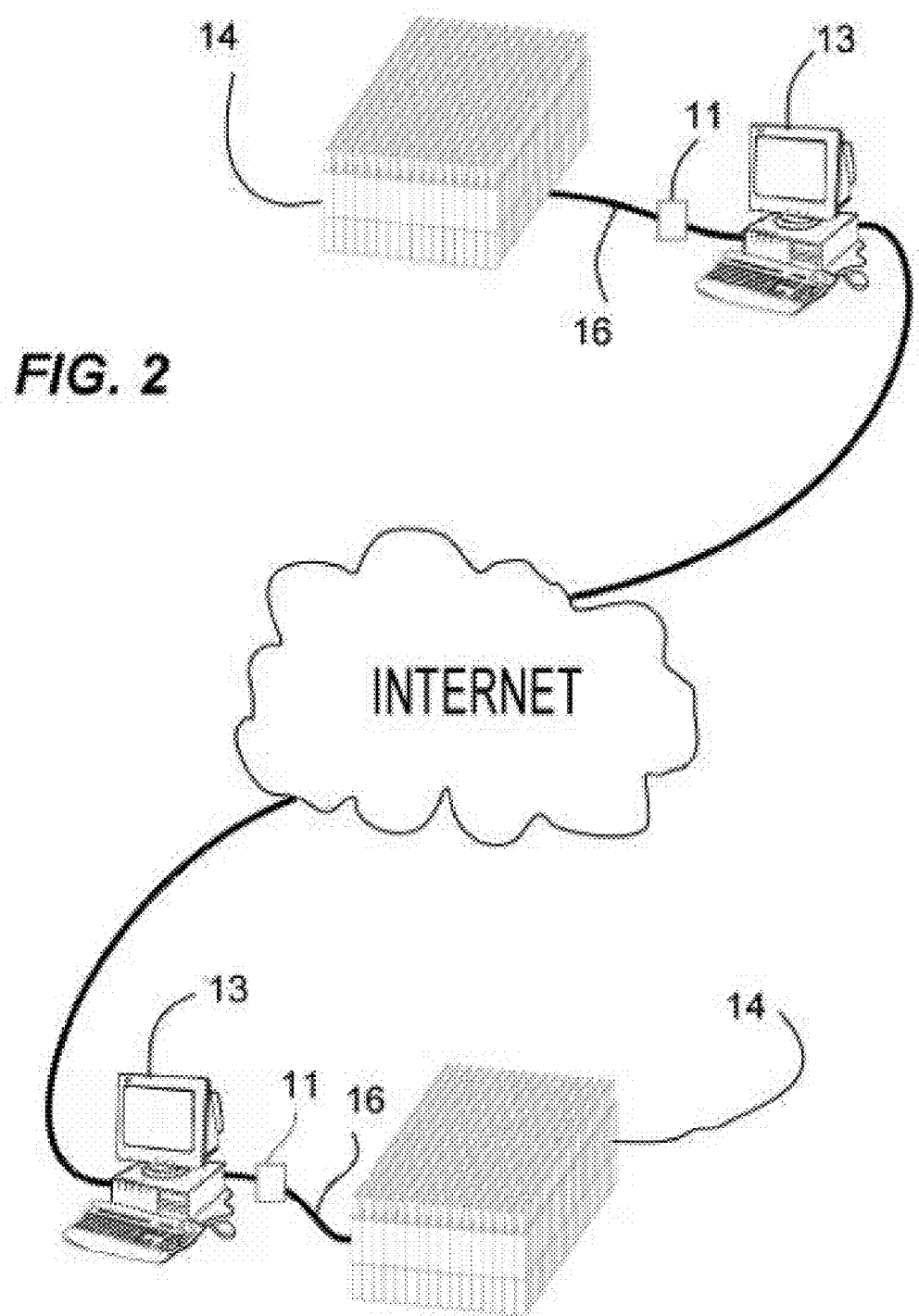
FIG. 2 Schematic view of the invention in context.
Figures 3A, 3B:
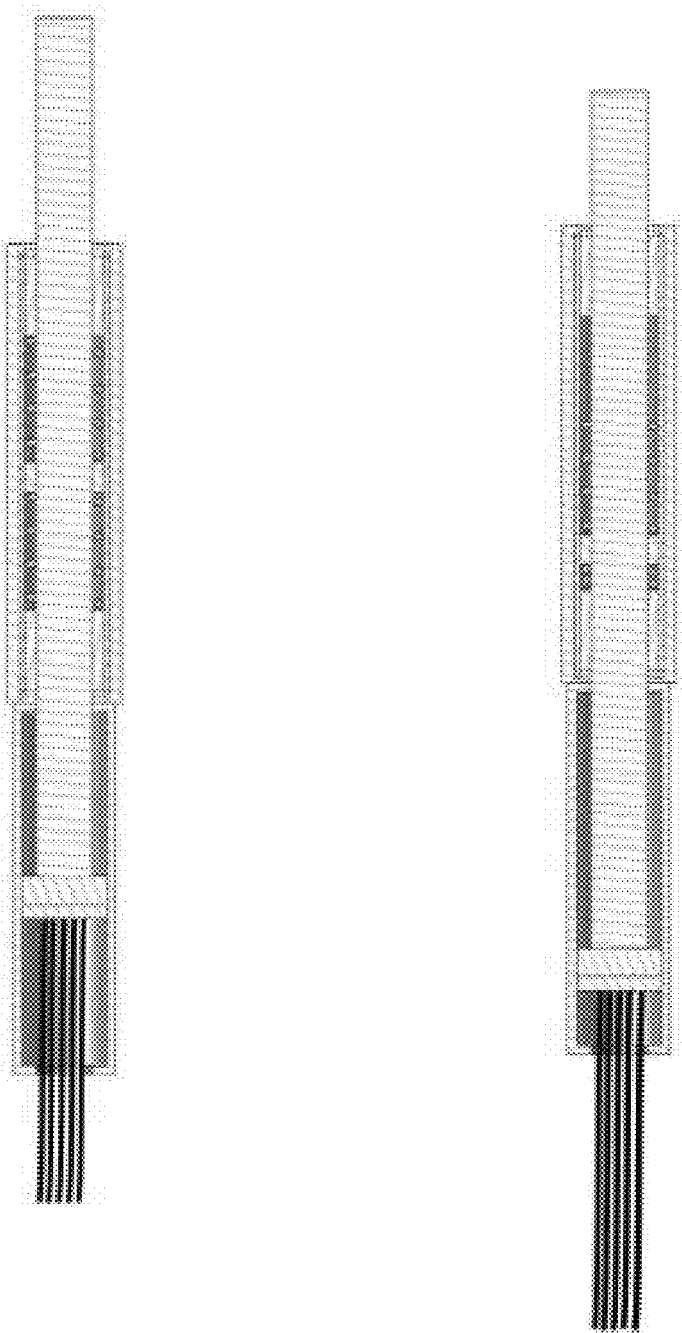
FIGS. 3a-b Cutaway side views of the pin in rest mode and when pressed upon.
Figure 4:
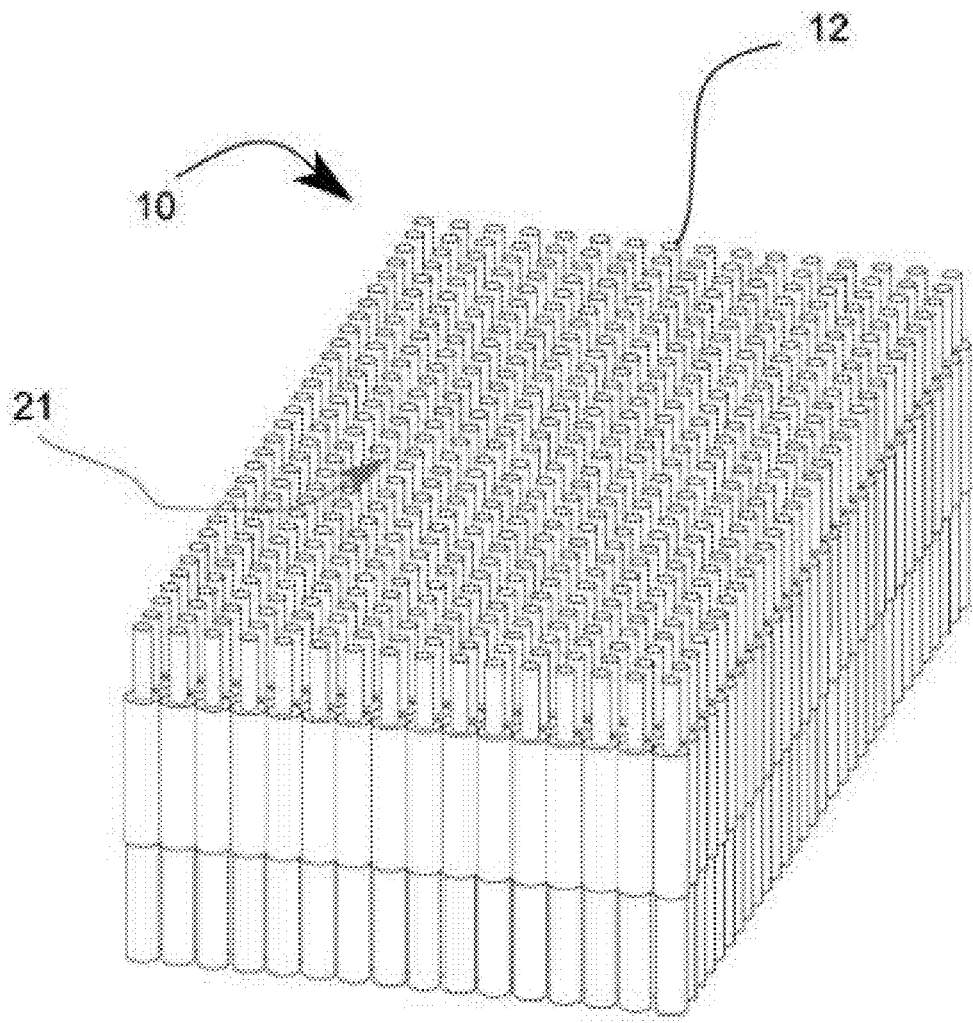
FIG. 4 Isometric view of a pin array device.

An interactive pin array device (10) consists in a plurality of electromechanical pins (12) held inside a frame (14). A connector means (16) connects the interactive pin array device (10) to an analog to digital converter, hereinafter known as ADC (11), and then to a microprocessor operated device (13) such as a computer, tablet, smartphone, game console, etc . . .

Each electromechanical pin (12) consists of an elongated pin member (18), an upper housing (20), an upper electromagnet (22), a shield member (24), a magnet (26), a lower electromagnet (28), a lower housing (30), an outer part linear potentiometer (32), an inner part linear potentiometer (33), an electronic transmitter (34), wiring (36), upper spring (38), lower spring (40). Each pin member (18) has a distal end (19) such that when not in an operating mode, the plurality of distal ends form a flat virtual plane (21).

When a user (not shown) manually pushes down on the pin member (18), the resistance in the outer part linear potentiometer (32) varies, which is processed by the electronic transmitter (33) which then sends an electronic signal such as a Pulse Width Modulation signal hereinafter referred to as PWM (34) down the wiring (36) to the ADC (11). The springs (38, 40) create an opposition force to the electromagnetic force to create a smoother, more fluid displacement of the electromechanical pin (12).

When receiving a signal, the electromagnets (22, 28) react to the PWN (34) received from the ADC (11) by way of digital data received by the computer (13). The range of displacement of the pin member (18) is proportional to the strength of the PWM (34) received by the electromagnets (22, 28).

Figure 5A:
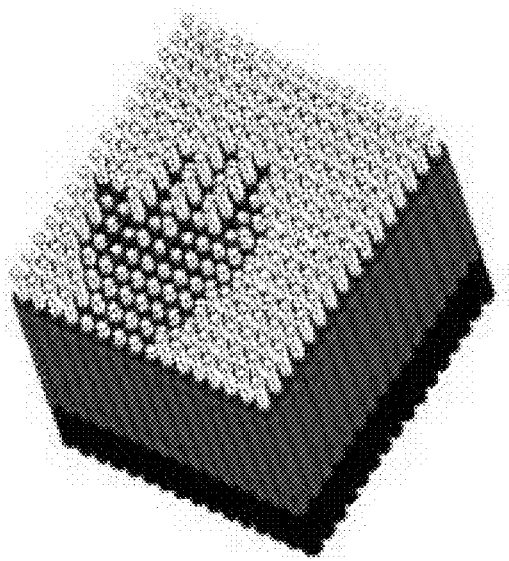
FIGS. 5a-b Isometric view of an imprint on one end and the and the result at the other end.
Figure 5B:
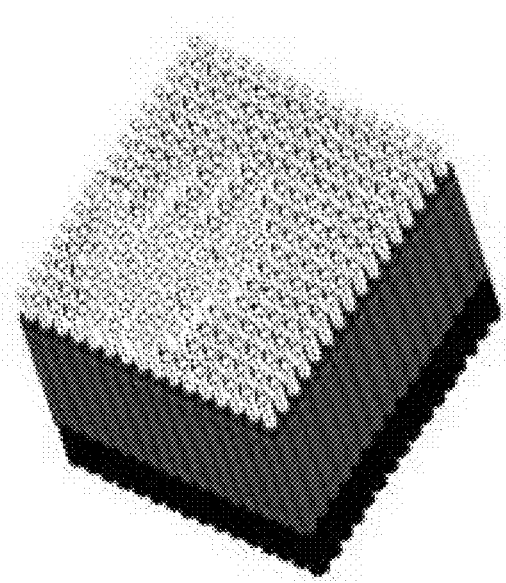

When connected to a web hosted Internet service, The local microprocessor operated device (13) reads out the digital data from the ADC (11) of the local pin array device (10), as seen in FIG. 5A for example, and sends data to a remote microprocessor using the Internet. The remote microprocessor operated device (13) receives the signal and sends a PWM (34) to its pin array device (10) corresponding to a negative image, as seen in FIG. 5B, of the local pin array device (10) and vice versa.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. An interactive pin array device comprising a plurality of elongated pins held in a frame and forming a set; said frame adapted to hold said plurality of pins in a parallel position to one another in a series of columns and rows, such that the distal ends of said plurality of pins together form a flat virtual plane;

each pin of said plurality of pins includes an elongated housing member defining a linear axis therethrough, and a pin member adapted to slide linearly in either direction along said axis;

each said housing member includes an upper electromagnet and a lower electromagnet separated from said upper electromagnet, each said electromagnet being adapted to move its respective pin member linearly in either direction;

each said pin member includes at least one linear potentiometer, and an electronic transmitter attached to an opposite end to said distal end, such that when each of said pin members are moved linearly each respective linear potentiometer sends a signal to its respective transmitter which in turn sends an electronic signal describing its movement within its respective housing member;

a plurality of electronic wires respectively connected to each transmitter, such that electronic signals can be relayed to and from each respective pin;

an analog-digital converter connected to said plurality of electronic wires and adapted to convert the analog electronic signals relayed by said transmitters into digital format to be transmitted, processed, stored, and then converted back into analog form for return transmittal to said set of pins;

and a microprocessor device connected to said converter and adapted to retrieve said electronic signals from said converter, store them, and re-transmit them back to said converter when desired, such that a user can displace said pin members from said virtual plane in any pattern, have electronic signals sent, processed, stored, and returned to the same set of pins, or another separate set of pins, at a later time to thereby displace said pins to the same positions as said original pattern chosen by said user.

2. The interactive pin array device of claim 1, wherein each said housing member of each pin comprises an upper frame and a lower frame; wherein said upper frame houses said upper electromagnet.

3. The interactive pin array device of claim 1, wherein an upper frame houses said upper electromagnet; and further includes an upper spring, a lower spring, a shield member, and a magnet such that said springs create an opposite force to resulting electromagnetic forces on said pin member and thereby results in smoother movements of said pin member.

4. The interactive pin array device of claim 1, wherein said linear potentiometer, and said electronic transmitter, and wherein said linear potentiometer comprises an outer part situated on a side of said opposite end of said pin member, and an inner part situated on an end surface of said opposite end of said pin member.

5. The interactive pin array device of claim 1, wherein said electronic signal is formed as a Pulse Width Modulation signal, and wherein the displacement of each said pin members is proportional to the strength of said Pulse Width Modulation signal received by said electromagnets.

6. An interactive pin array device comprising a first pin set including a plurality of elongated pins held in a frame, said frame adapted to hold said plurality of pins in a parallel position to one another in a series of columns and rows, such that the distal ends of said plurality of pins together form a flat virtual plane;
- each pin of said plurality of pins includes an elongated housing member defining a linear axis therethrough, and a pin member adapted to slide linearly in either direction along said axis;
- each said housing member includes an upper electromagnet, and a lower electromagnet separated from said upper electromagnet, each said electromagnet being adapted to move its respective pin member linearly in either direction;
- each said pin member includes at least one linear potentiometer, and an electronic transmitter attached to an opposite end to said distal end, such that when each of said pin members are moved linearly each respective linear potentiometer sends a signal to its respective transmitter which in turn sends an electronic signal describing its movement within its respective housing member;
- a plurality of electronic wires respectively connected to each transmitter, such that electronic signals can be relayed to and from each respective pin;
- an analog-digital converter connected to said plurality of electronic wires and adapted to convert the analog electronic signals relayed by said transmitters into digital form to be transmitted, processed, stored, and then converted back into analog form for return transmittal to said set of pins;
- and a microprocessor device connected to said converter and adapted to retrieve said electronic signals from said converter, store them, and transmit them to a second microprocessor; said second microprocessor being connected to a second analog-digital converter adapted to convert said digital signal to an analog signal to be sent to a second pin set;
- said second pin set being formed identically to said first pin set, such that a user can displace said pin members from said virtual plane of said first pin set in any pattern, have electronic signals sent, processed, stored, and sent to said second pin set to thereby displace said its respective set of pins to the same positions as said original pattern of said first set of pins chosen by said user.

7. The interactive pin array device of claim 6, wherein each said housing member of each pin comprises an upper frame and a lower frame; wherein said upper frame houses said upper electromagnet.

8. The interactive pin array device of claim 6, wherein an upper frame houses said upper electromagnet; and further includes an upper spring, a lower spring, a shield member, and a magnet such that said springs create an opposite force to resulting electromagnetic forces on said pin member and thereby results in smoother movements of said pin member.

9. The interactive pin array device of claim 6, wherein said linear potentiometer, and said electronic transmitter, and wherein said linear potentiometer comprises an outer part situated on a side of said opposite end of said pin member, and an inner part situated on an end surface of said opposite end of said pin member.

10. The interactive pin array device of claim 6, wherein said electronic signal is formed as a Pulse Width Modulation signal, and wherein the displacement of each said pin members is proportional to the strength of said Pulse Width Modulation signal received by said electromagnets.

11. The interactive pin array device of claim 6, wherein said first microprocessor is connected to said second microprocessor via a wireless connection.

12. The interactive pin array device of claim 11, wherein said wireless connection makes use of the Internet.

* * * * *